(12) United States Patent
Shibata

(10) Patent No.: US 6,702,298 B2
(45) Date of Patent: Mar. 9, 2004

(54) CONSTRUCTION FOR PREVENTING A DISENGAGEMENT OF A SEALING PACKING AND A COVER PROVIDED THEREWITH

(75) Inventor: Takahiro Shibata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 11 days.

(21) Appl. No.: 10/104,102

(22) Filed: Mar. 21, 2002

(65) Prior Publication Data

US 2002/0135138 A1 Sep. 26, 2002

(30) Foreign Application Priority Data

Mar. 21, 2001 (JP) ........................................ 2001-080693

(51) Int. Cl.[7] .............................................. F16J 15/02
(52) U.S. Cl. ...................................................... 277/628
(58) Field of Search ........................ 277/628; 123/195 C

(56) References Cited

U.S. PATENT DOCUMENTS 4,508,072 A * 4/1985 Takami et al. .......... 123/195 C
4,950,210 A * 8/1990 Kawauchi et al. .......... 474/144
6,142,806 A   11/2000 Yamashita et al.

FOREIGN PATENT DOCUMENTS

JP   4-337154   * 11/1992
JP   8-210511   *  8/1996

* cited by examiner

Primary Examiner—William L. Miller
(74) Attorney, Agent, or Firm—Gerald E. Hespos; Anthony J. Casella

(57) ABSTRACT

An arcuate sealing packing (10) has disengagement restraining projections (11) that project on the outer circumferential surface of opposite ends of the arcuate packing (10). The arcuate packing (10) is mounted an arcuate portion (R) of a cover (C). The disengagement restraining projections (11) are fitted inside restraining surfaces (33) of the cover (C). Thus, even if a force acts on the end of the arcuate packing (10) in a disengaging direction the outer circumferential surfaces of the disengagement restraining projections (11) contact the restraining surfaces (33A) to restrain the end from disengaging in the radially outward direction. Thus, the arcuate packing (10) does not easily disengage.

19 Claims, 9 Drawing Sheets

CONSTRUCTION FOR PREVENTING A
DISENGAGEMENT OF A SEALING
PACKING AND A COVER PROVIDED
THEREWITH

BACKGROUND OF THE INVENTION

1. Field of the Invention

The invention relates to a construction for preventing disengagement of a sealing packing mounted along an outer edge of a cover.

2. Description of the Related Art

Rubber sealing packings 1, 2 conventionally have been mounted along an outer edge of a cover C for a timing belt, as shown in FIG. 10. The cover C has an arcuate end R, and the sealing packing 1 mounted on the arcuate end R has a U-shaped cross section for tightly holding an edge of the arcuate end R, as shown in FIGS. 11 and 12. Locking recesses 3 are arrayed at even intervals on one surface of the edge of the arcuate end R, and the sealing packing 1 has locking projections 4 that correspond to the respective locking recesses 3. The locking recesses 3 engage the locking projections 4 to prevent disengagement of the sealing packing 1.

The sealing packing 1 may work well over most of the cover C. However, opposite ends of the sealing packing 1 have no locking projections 4, and portions of the arcuate end R opposed to the ends of the sealing packing 1 have no locking recesses 3. Thus, the opposed ends of the sealing packing 1 may turn up locally and the rubber packing 1 may come off entirely due to the turned-up ends.

In view of the above problem, an object of the present invention is to provide a construction that prevents a sealing packing from coming off.

SUMMARY OF THE INVENTION

The invention is directed to a construction for preventing disengagement of a sealing packing. The sealing packing is a long piece that can be mounted on an outer edge of a cover by engaging recesses and projections. The cover comprises a restraining portion that contacts at least an outer surface of the end of the sealing packing to restrain disengagement of the sealing packing.

The restraining portion can press the outer surface of the sealing packing to restrain the end of the sealing packing from disengaging even if a force acts on the end of the sealing packing in a withdrawing direction. Thus, an engaging force of the sealing packing can be strengthened.

The sealing packing preferably comprises a first sealing packing mountable to a first outer edge of the cover, and a second sealing packing mountable to a second outer edge of the cover and having an end adjacent to the first sealing member.

The first sealing packing has a U-shaped cross section and can fit into a portion of the first outer edge. The second sealing packing preferably can fit into a mounting groove of a rail formed at the second outer edge.

The restraining portion preferably is at an end of the second outer edge, and preferably at an end of the rail. Thus, the restraining portion can contact and press an outer surface of an end of the first sealing packing.

A mounting direction of the second sealing packing into the mounting groove preferably intersects a mounting direction of the first sealing packing on the outer edge of the cover. Additionally the end of the first sealing packing preferably presses an outer surface of the end of the second sealing packing to prevent the end of the second sealing packing from disengaging.

Locking projections may be formed on the sealing packing, and locking recesses may be formed in both inner and outer surfaces of the outer edge of the cover for engagement with the locking projections. The disposition of locking recesses at both the inner and the outer surfaces of the outer edge of the cover enhance the engaging force of the sealing pack.

The locking recesses in the inner surface and those in the outer surface preferably are displaced along the longitudinal direction of the outer edge of the cover. Thus, a high engaging force can be achieved even if the outer edge of the cover is thin. Further, an engagement area of the locking recesses and the locking projections can extend over a wide range by displacing the locking recesses in the inner surface from those in the outer surface, thereby further enhancing the engaging force of the sealing packing.

The invention also relates to a cover for covering part of an automotive vehicle, such as a timing belt. The cover comprises at least one construction to prevent disengagement of a sealing packing as described above.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

The invention is directed to packing for a cover C that covers a driving device, such as a timing belt of an automotive vehicle. A bottom side of the cover C is shown in FIGS. 1 to 9. However, the top side of the cover C is omitted to simplify the drawings.

Figure 1:
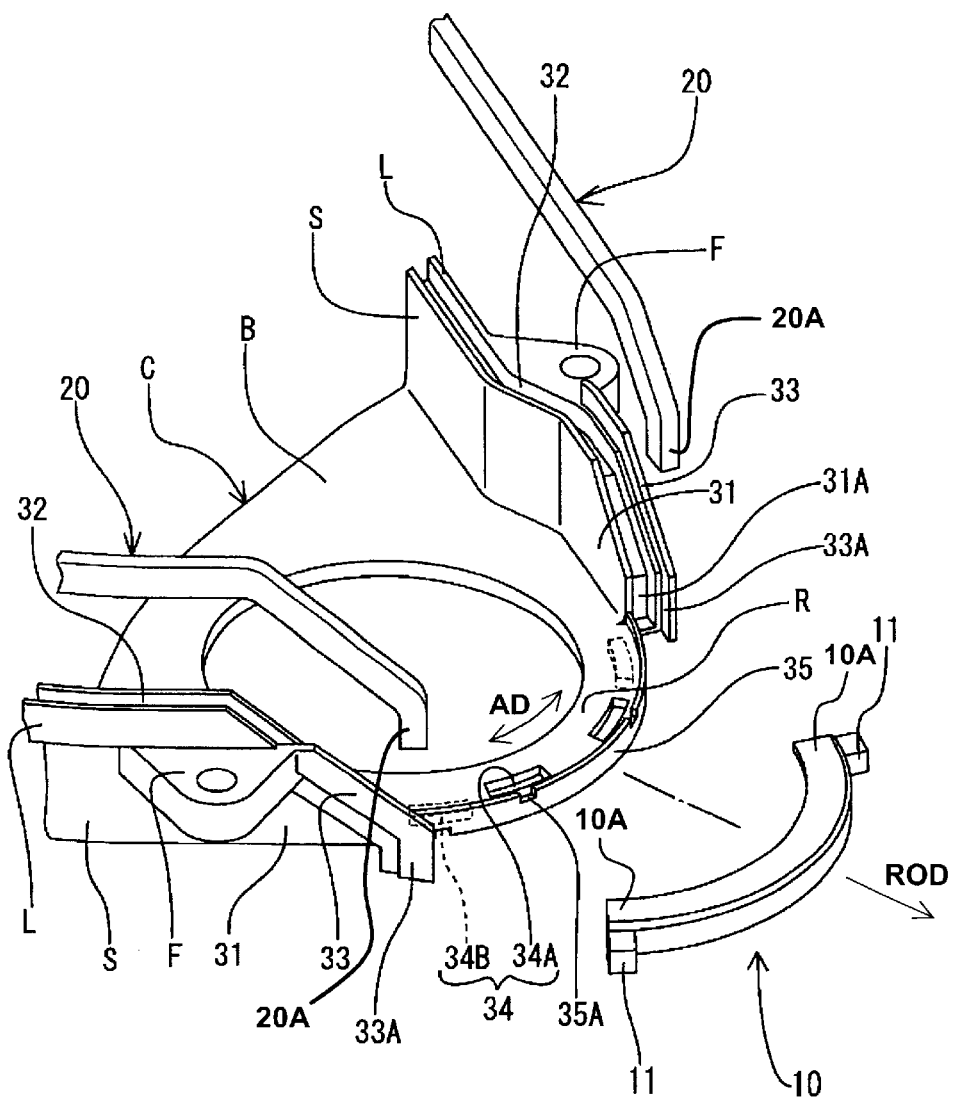
FIG. 1 is an exploded perspective view showing one embodiment of the present invention.

The cover C is integrally or unitarily made e.g. of a synthetic resin and is comprised of a main plate B and sidewalls S that project inwardly from lateral edges of the main plate B. An arcuate portion R is formed at a bottom end of the cover C, and no sidewall S is provided at or near the arcuate portion R. A mounting piece F bulges out at a suitable position of each sidewall S and is formed with a bolthole for mounting the entire cover C to a support, such as a body of an automotive vehicle. Two mounting pieces F are illustrated in FIG. 1. However, more mounting pieces F are provided at different positions.

At least one bar-shaped packing 20 and an arcuate packing 10 are mounted on the cover C to seal between the driving device and the cover C.

A rail L bulges out substantially in L-shape along the projecting edge of each sidewall S. The rail L has a substantially U-shaped cross section that opens toward the driving device. A mounting groove 32 is defined inside the rail L for receiving at least part of the bar-shaped packing 20. An intermediate portion 31 of each sidewall S within a specified range near the arcuate portion R slopes down toward the arcuate portion R. A bottom end of the intermediate portion 31 is aligned substantially with a corresponding end of the arcuate portion R, and the intermediate portion 31 is cut off substantially vertically to form a vertical section 31A. The rail L substantially follows the configuration of the intermediate portion 31 and the vertical portion 31A. Further, a protection wall 33 is provided on the outer side of the rail L between the intermediate portion 31 and the vertical portion 31A to provide a double-wall construction. The protection wall 33 projects a longer distance than the rail L.

Each bar-shaped packing 20 is made of a resilient material, preferably a rubber material, that has a suitable elasticity or resiliency and has a length sufficient to be fitted at least partly in the mounting groove 32 over substantially the entire length of the mounting groove 32. One end of the bar-shaped packing 20 has a shape that conforms with the intermediate portion 31 and the vertical portion 31A. Thus, each bar-shaped packing 20 is mounted over the entire length of the corresponding mounting groove 32 while conforming to the shape of the mounting groove 32 and being slightly pressed. Each bar-shaped packing 20 is dimensioned not to project up from the mounting groove 32 where the protection wall 33 is provided, but projects up from the mounting groove 32 where there is no protection wall 33.

Figure 6:
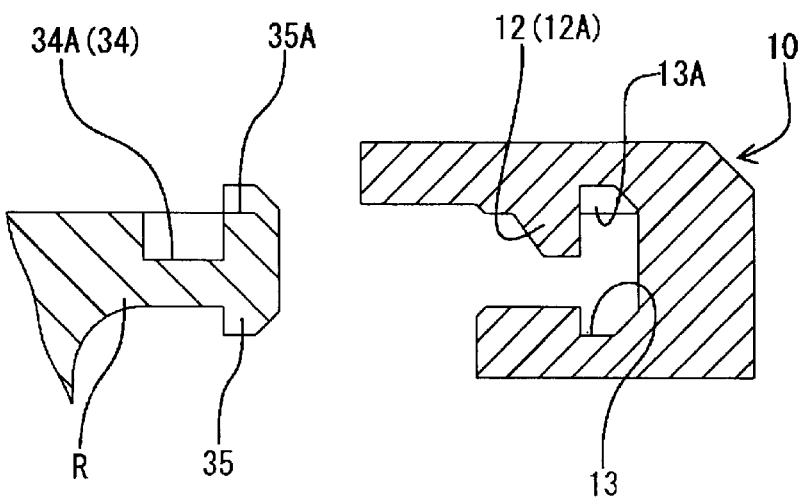
FIG. 6 is a section of the arcuate packing before assembling.
Figure 7:
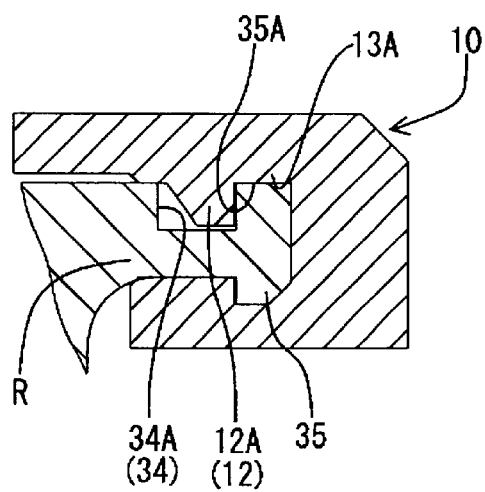
FIG. 7 is a section of the arcuate packing after assembling.

A mounting wall 35 is formed along the outer edge of the arcuate portion R and projects inwardly as well as outwardly on both opposite sides of the arcuate portion R. Thus, the outer edge of the arcuate portion R has a substantially T-shaped cross section, as shown in FIGS. 6 and 7. Two locking recesses 34 are formed near the mounting walls 35 in each of the outer and inner surfaces of the arcuate portion R. As shown in FIG. 1, the two locking recesses 34B are formed near the ends of the arcuate portion R in the outer surface and the two locking recesses 34A are formed in the inner surface between the locking recesses 34B. Further, narrow notches 35A are formed at positions on the mounting wall 35 that substantially correspond to the respective locking recesses 34.

The arcuate packing 10 has a shape that substantially conforms to with the shape of the arcuate portion R. A fitting groove 13 is formed in the inner circumferential surface of the arcuate packing 10 and has a cross section that conforms to the cross section of the mounting wall 35. Thus, the arcuate packing 10 can cooperate with the arcuate portion R and can be held tightly with resilient forces acting from inner and outer sides. Locking projections 12 project up and down in the fitting groove 13 of the arcuate packing 10 and substantially align with and engage the respective locking projections 34. Thus, the locking projections 34 prevent the arcuate packing 10 from disengaging outwardly. Displacement preventing portions 13A are formed at the inner side of the respective locking recesses 12 for preventing a circumferential displacement in an azimuthal direction AD of the arcuate packing 10 by fitting the displacement preventing portions 13A into the notches 35A when the arcuate packing 10 is mounted on the arcuate portion R.

Figure 2:
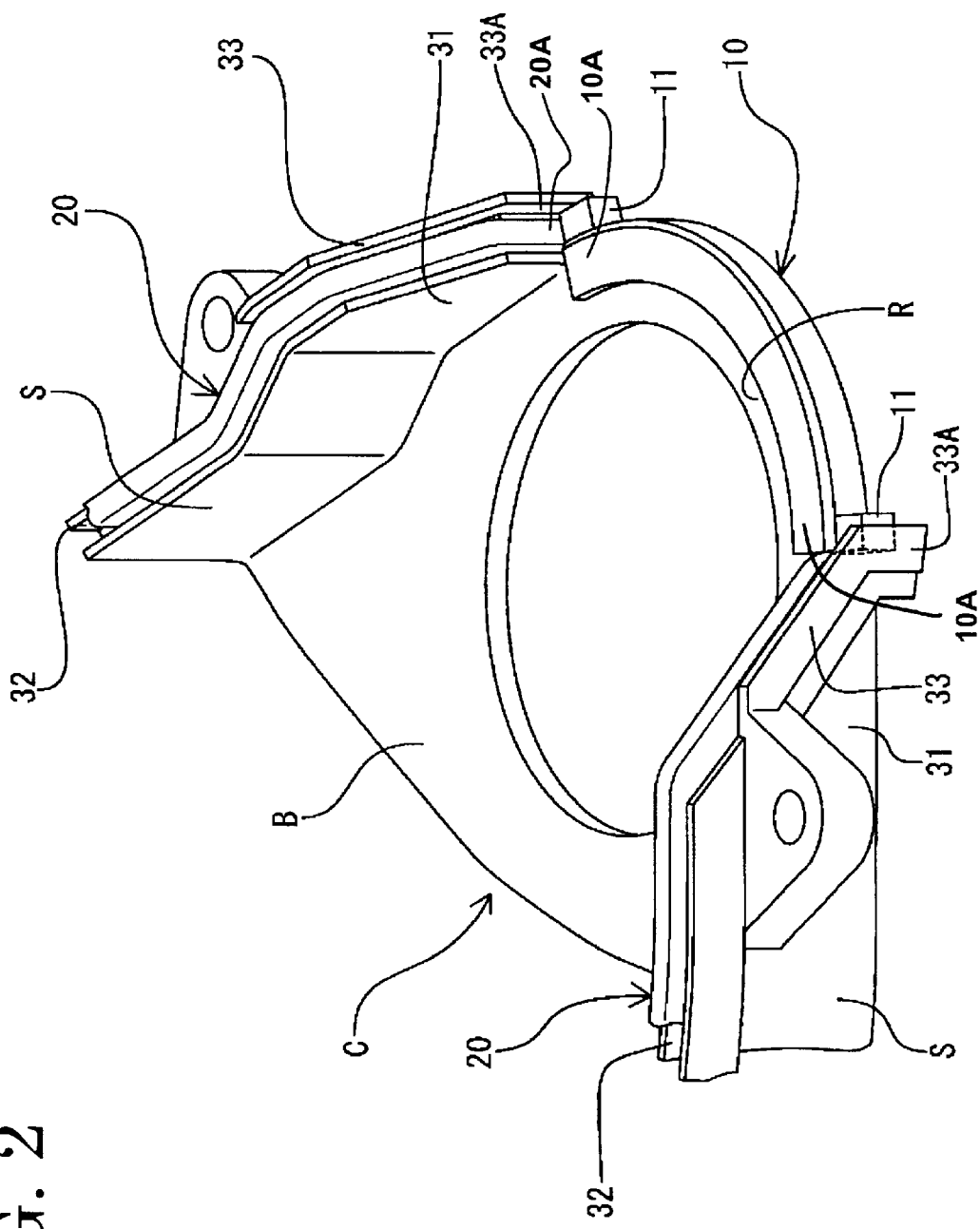
FIG. 2 is a perspective view of the embodiment after assembling.
Figure 3:
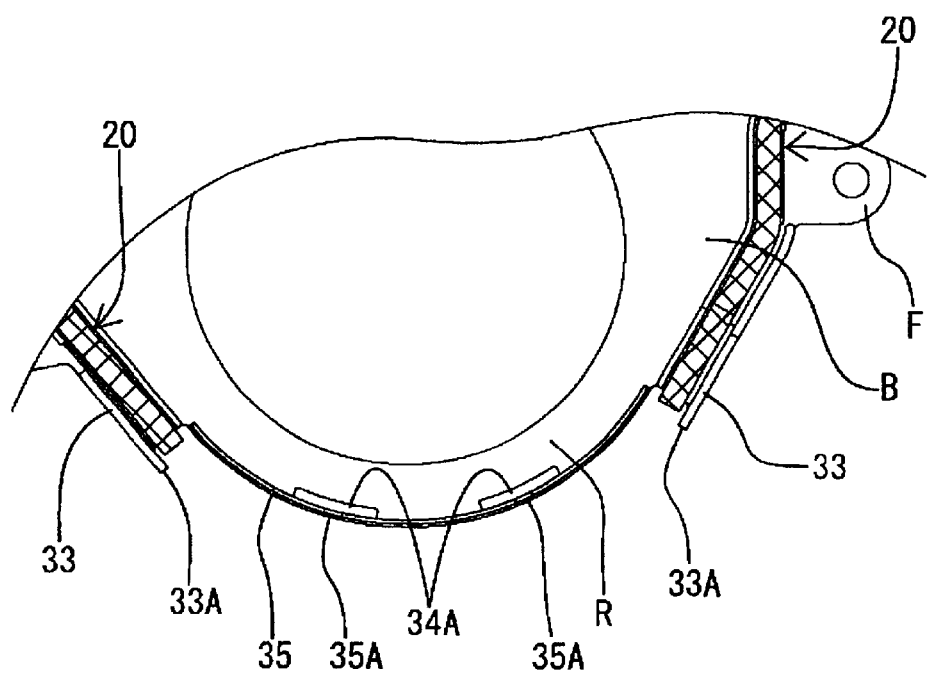
FIG. 3 is a front view of an arcuate packing.
Figure 4:
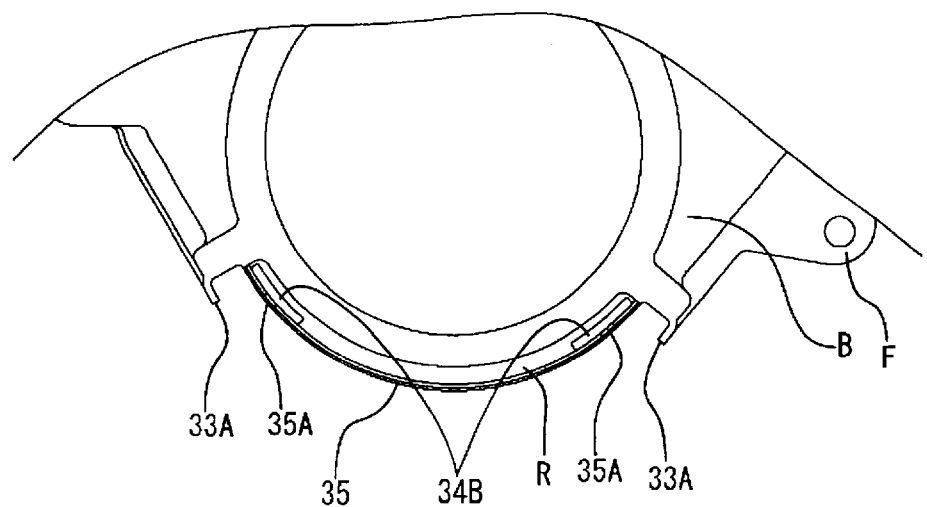
FIG. 4 is an enlarged view of an inner side of an arcuate portion.
Figure 5:
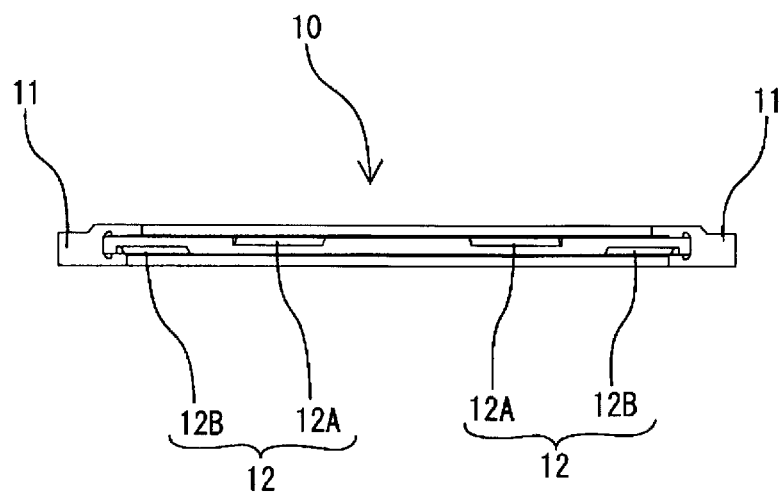
FIG. 5 is a side view of the arcuate portion.

Disengagement restraining projections 11 are formed integrally or unitarily at opposite ends of the outer circumferential surface of the arcuate packing 10 with respect to the longitudinal or azimuthal direction AD. Each disengagement restraining projection 11 is substantially in the form of a rectangular parallelepiped and has a thickness slightly smaller than the arcuate packing 10. Outer circumferential surfaces of the disengagement restraining projections 11 contact the restraining surfaces 33A at the bottom ends of the protection walls 33 when the arcuate packing 10 is mounted on the arcuate portion R. Thus, the ends 10A of the arcuate packing 10 can be prevented from disengaging. Further, the outer circumferential surfaces of the two disengagement restraining projections 11 press the ends of the bar-shaped packings 20, as shown in FIG. 2, and prevent the ends 20A of the bar-shaped packings 20 from disengaging.

The bar-shaped packings 20 are pressed into the mounting grooves 32 and are compressed resiliently. Thus, the resilient bar shaped packings 20 will not displace easily from the mounting grooves 32. The bar-shaped packings 20 also are mounted to conform substantially to the shapes of the intermediate portions 31 and the vertical portions 31A. Thus, one end of each bar-shaped packing 20 faces the corresponding end of the arcuate portion R.

Subsequently, the arcuate packing 10 is mounted on the arcuate portion R by pressing the mounting wall 35 into the fitting groove 13 of the arcuate packing 10. As a result, the arcuate packing 10 is brought resiliently into close contact with the arcuate portion R. At this time, the locking projections 12A, 12B enter and engage the corresponding locking recesses 34A, 34B in the opposite inner and outer side surfaces to prevent the arcuate packing 10 from coming off outwardly. The locking recesses 34A and 34B are offset with respect to each other in the azimuthal direction AD of the arcuate portion R. Further, the displacement preventing portions 13A and the notches 35A are engaged to prevent a circumferential displacement along the azimuthal direction AD of the arcuate packing 10 (see FIG. 7).

Figure 8:
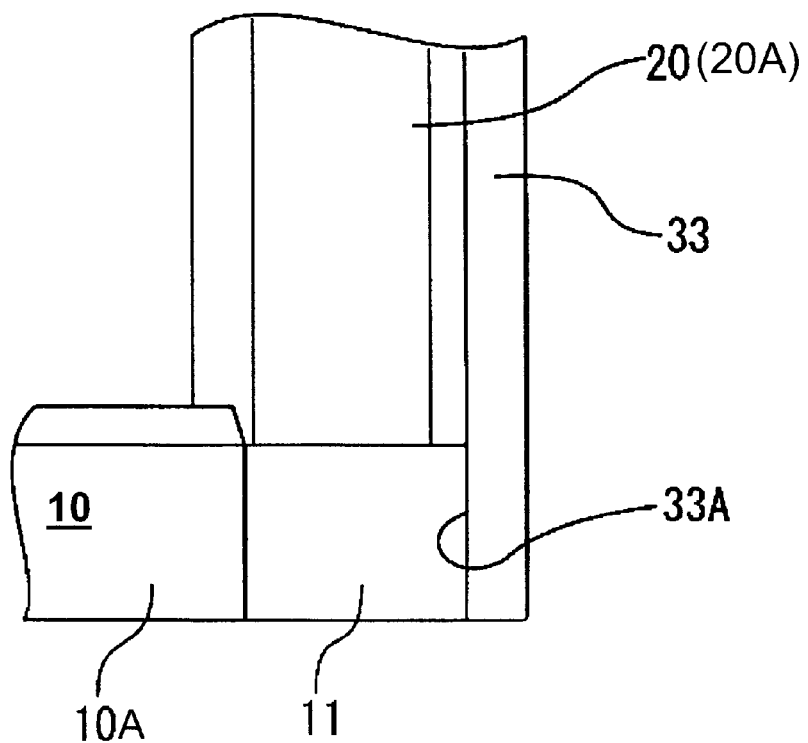
FIG. 8 is an enlarged view of an end of the arcuate portion after assembling.

The disengagement restraining projections 11 of the arcuate packing 10 are pressed into clearances between the restraining surfaces 33A of the protection walls 33 and the opposite ends of the arcuate portion R, as shown in FIG. 8, and are compressed resiliently. Therefore, the disengagement restraining projections 11 do not separate easily from the inside of the restraining surfaces 33A.

Figure 9:
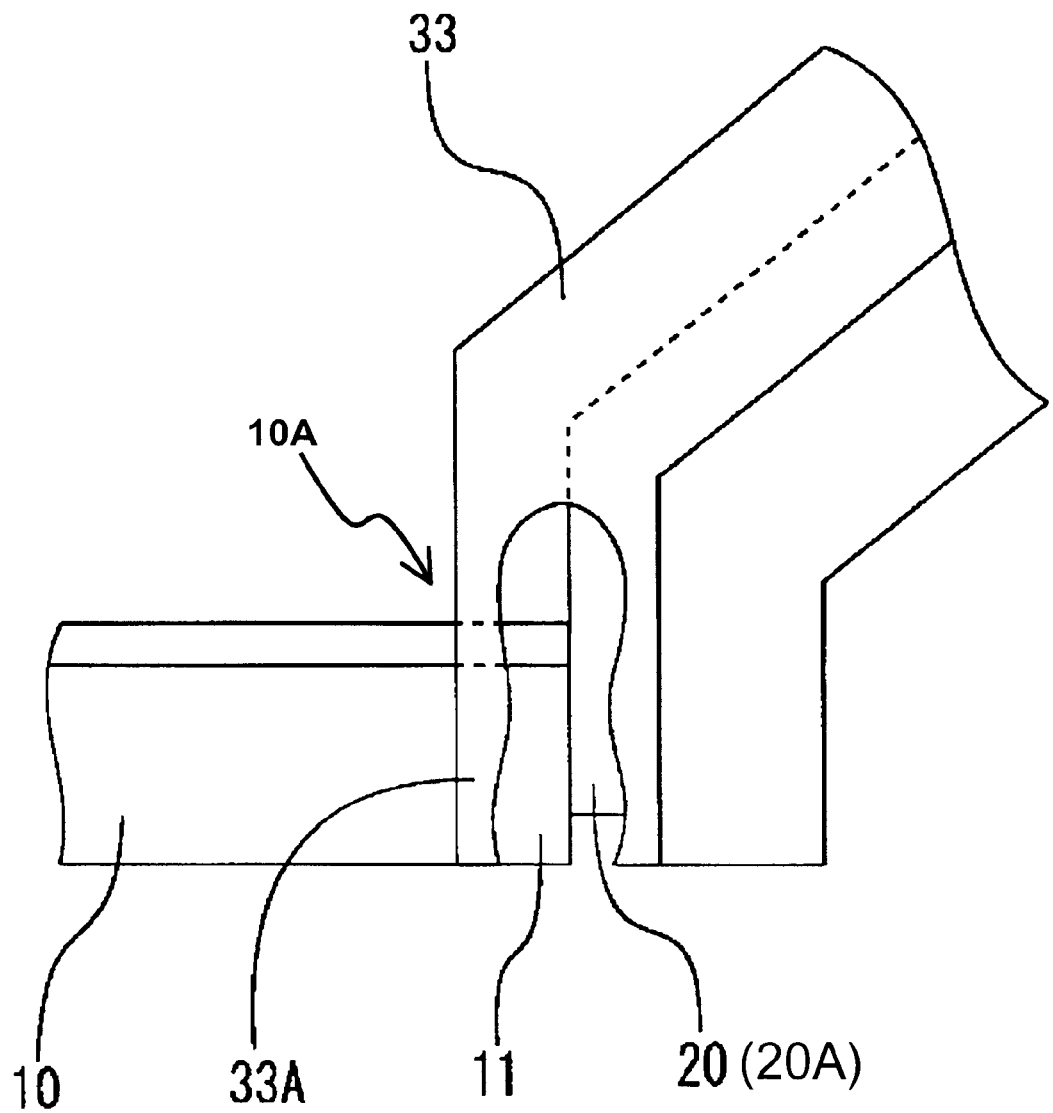
FIG. 9 is an enlarged view of the end of the arcuate portion after assembling when viewed in another direction.
Figure 10:
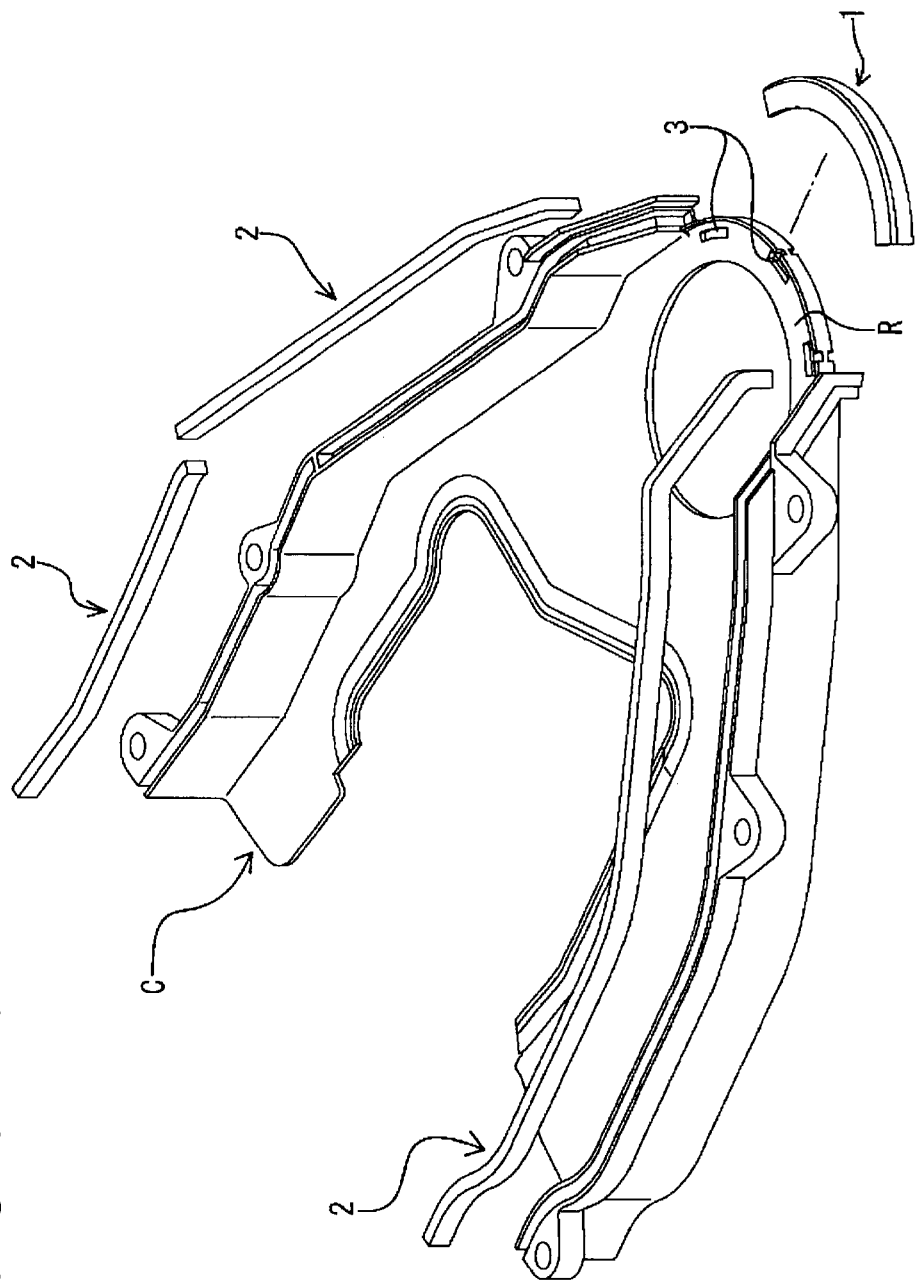
FIG. 10 is an exploded perspective view of a prior art construction.
Figure 11:
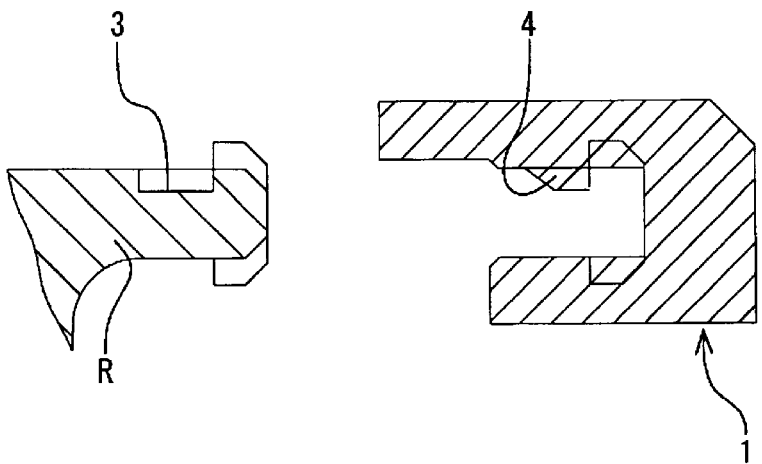
FIG. 11 is a section of the prior art construction before assembling.
Figure 12:
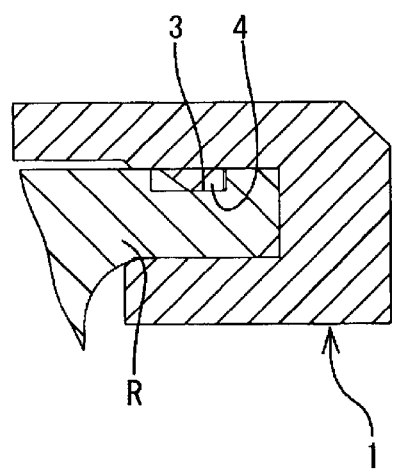
FIG. 12 is a section of the prior art construction after assembling.

The disengagement restraining projections 11 are at the outer sides of the ends of the bar-shaped packings 20 that face the ends of the arcuate portion R, as shown in FIG. 9. Hence, the disengagement restraining projections 11 press the ends of the bar-shaped packings 20 against the arcuate packing 10 through the openings of the mounting grooves 32, and prevent the ends of the bar-shaped packings 20 from coming off.

The packings 20, 10 protect the outer peripheral portion of the cover C from water when the cover C with the bar-shaped packings 20 and the arcuate packing 10 is mounted on the driving device.

An external force may act on the entire arcuate packing 10. However, the engagement of the fitting groove 13 and the mounting wall 35 and the engagement of the locking projections 12 and the locking recesses 34 prevent the arcuate packing 10 from disengaging outwardly. The engagement of the locking recesses 34A, 34B and the locking projections 12A, 12B is made on both the inner and the outer surfaces of the arcuate portion R. Thus, an engaging force of the arcuate packing 10 can be strengthened. In addition, the locking recesses 34B in the outer surface and the locking recesses 34A in the inner surface are circumferentially offset from each other. The locking projections 12 and the locking recesses 34 engage over a wide range. Further, circumferential displacement of the arcuate packing 10 is prevented by the engagement of the displacement preventing portions 13A and the notches 35A.

A force may act on the end of the arcuate packing 10 in a radially outward direction of the arcuate portion R. In this situation, the end of the arcuate packing 10 tries to come off in the radially outward direction ROD of the arcuate portion R together with the disengagement restraining projection 11. However, the radially outer end surface of the disengagement restraining projection 11 is pressed in contact with the corresponding restraining surface 33A of the protection wall 33 (see FIG. 8) to prevent movement of the disengagement restraining projection 11. This substantially prevents the end of the arcuate packing 10 from disengaging.

A force may act on the end of the bar-shaped packing 20 adjacent to the arcuate packing 10 in a direction toward the opening of the mounting groove 32. This end of the bar-shaped packing 20 tries to come off in the direction toward the opening of the mounting groove 32. However, the outer circumferential surface of the end of the bar-shaped packing 20 is pressed by the outer circumferential end surface of the disengagement restraining projection 11 (see FIG. 9). Thus, movement of this end of the bar-shaped packing 10 is prevented, thereby preventing the end of the bar-shaped packing 10 from disengaging.

As described above, the disengagement restraining projections 11 are pressed by the restraining surfaces 33A at the ends of the arcuate packing 10. Thus, even if a force acts in the disengaging direction ROD, the arcuate packing 10 does not easily come off the arcuate portion R.

The locking recesses 34 are displaced circumferentially in both the outer and inner surfaces of the arcuate portion R. Thus, the locking projections 12 and the locking recesses 34 can be engaged over a wide range in both the inner and outer surfaces of the arcuate portion R. Such locking recesses conventionally would not be circumferentially displaced, and hence could be formed in only one surface due to an insufficient thickness.

Engagement of the displacement preventing portions 13A and the notches 35A prevents circumferential displacement of the arcuate packing 10.

Thus, according to this preferred embodiment, it has become possible to strengthen the overall engaging force of the arcuate packing 10.

The disengagement restraining projections 11 press the ends of the bar-shaped packings 20. Therefore, the engaging forces of the bar-shaped packings 20 can be improved.

Further, the disengagement restraining projections 11 of the arcuate packing 10 prevent both the disengagement of the ends of the arcuate packing 10 and the ends of the bar-shaped packings 20.

The invention is not limited to the above described and illustrated embodiment. For example, following embodiments also are embraced by the technical scope of the invention as defined by the claims. Beside the following embodiments, various changes can be made without departing from the scope and spirit of the present invention as defined by the claims.

The prevent invention is applied to the arcuate sealing packing mounted at the arcuate edge in the foregoing embodiment. However, it may be also applied to a sealing packing to be mounted on a straight edge.

The disengagement restraining projections 11 are pressed by restraining surfaces 33A that bulge out from the protection walls 33 in the foregoing embodiment. However, they may be pressed by other members.

The bar-shaped packings 20 are pressed into the mounting grooves 32 and held by their resilient reaction forces in the foregoing embodiment. However, they may be adhered by applying an adhesive to the facing surfaces of the bar-shaped packings 20 and the mounting grooves 32.

The disengagement restraining projections 11 prevent disengagement of both the arcuate packing 10 and the bar-shaped packings 20 in the foregoing embodiment. However, separate disengagement preventing members may be provided for the respective packings 10, 20.

What is claimed is:

1. A construction for preventing disengagement of an elongate sealing packing to be mounted on an outer edge of a cover, the outer edge of the cover comprising inner and outer surfaces and locking recesses formed in both the inner and outer surfaces of the outer edge of the cover, a plurality of locking projections formed on the sealing packing and being engageable with the locking recesses formed in both the inner and outer surfaces of the outer edge of the cover, wherein the cover comprises a restraining portion for restraining a disengagement of the sealing packing by contacting at least an outer surface of an end of the sealing packing.

2. The construction of claim 1, wherein the sealing packing comprises a first sealing packing mountable to a first outer edge of the cover and a second sealing packing mountable to a second outer edge of the cover and having an end adjacent to the first sealing packing.

3. The construction of claim 2, wherein the first sealing packing has a U-shaped cross section and is fittable into a portion of the first outer edge.

4. The construction of claim 3, wherein the second sealing packing is fittable into a mounting groove of a rail formed at the second outer edge.

5. The construction of claim 4, wherein the restraining portion is provided at an end of the second outer edge of the rail so that the restraining portion can contact an outer surface of an end of the first sealing packing.

6. The construction of claim 5, wherein a mounting direction of the second sealing packing to the mounting groove of the second outer edge is substantially normal to a mounting direction of the first sealing packing on the outer edge of the cover.

7. The construction of claim 6, wherein the end of the first sealing packing presses an outer surface of the end of the second sealing packing to prevent the end of the second sealing packing from disengaging.

8. The construction of claim 1, wherein the locking recesses formed in the inner surface and those formed in the outer surface are displaced along a longitudinal direction of the outer edge of the cover.

9. A cover having inner and outer surfaces and at least first and second outer edges, inner and outer mounting walls extending in opposite directions from the inner and outer surfaces at the first outer edge, at least one inner locking recess formed in the inner surface adjacent the inner mounting wall and at least one outer locking recess in the outer surface adjacent the outer mounting wall and offset from the inner locking recess, and an elongate sealing packing having a fitting groove mounted on the first outer edge of the cover, locking projections projecting into the fitting groove and engaging the locking recesses in the cover for restraining the sealing packing on the cover.

10. The cover of claim 9, wherein the first outer edge is curved, and wherein the first sealing pack is curved to conform substantially to the shape of the first outer edge.

11. The cover of claim 10, further comprising a second elongate sealing packing mounted to the second outer edge.

12. The cover of claim 11, wherein the second outer edge comprises a mounting groove, and wherein the second sealing packing is fittable into the mounting groove of the second outer edge.

13. The cover of claim 12, further comprising a restraining portion at an end of the second outer edge, the restraining portion contacting an outer surface of an end of the first sealing packing.

14. The cover of claim 13, wherein a mounting direction of the second sealing packing to the mounting groove of the second outer edge is substantially normal to a mounting direction of the first sealing packing on the first outer edge of the cover.

15. The cover of claim 13, wherein the first outer edge includes at least one notch, and wherein the first sealing packing includes at least one displacement preventing portion engaged with the notch.

16. A cover having at least first and second outer edges, at least one mounting wall extending from a surface of the cover at the first outer edge, at least one locking recess formed in the surface of the cover adjacent the mounting wall, the second outer edge having a mounting groove formed therein and a restraining portion at an end of the second outer edge and spaced outwardly from the first outer edge, first and second elongate sealing packings mounted respectively to the first and second outer edges, the second sealing packing (20) being mounted in the mounting groove of the second outer edge and having a free end in proximity to the restraining portion at the end of the second outer edge, the first sealing packing having a fitting groove mounted on the first outer edge of the cover, at least one locking projection projecting into the fitting groove and engaging the locking recess in the surface of the cover and the first sealing packing having a disengagement restraining portion at one end, the disengagement restraining portion of the first sealing packing engaging the free end of the second sealing packing for holding the second sealing packing in the mounting groove of the second outer edge, and the restraining portion at the end of the second outer edge engaging the disengagement restraining portion of the first sealing packing for holding the first sealing packing on the first outer edge of the cover.

17. The cover of claim 16, wherein the first outer edge is curved, and wherein the first sealing packing is curved to conform substantially to the shape of the first outer edge.

18. The cover of claim 17, wherein a mounting direction of the second sealing packing to the mounting groove of the second outer edge is substantially normal to a mounting direction of the first sealing packing on the first outer edge of the cover.

19. The cover of claim 17, wherein the first outer edge includes at least one notch, and wherein the first sealing packing includes at least one displacement preventing portion engaged with the notch.

* * * * *